Oct. 10, 1967 — L. GIARDINO — 3,345,753
MEASURING INSTRUMENT FOR MEASURING DISCONTINUOUS SURFACES AND TRANSDUCER THEREFOR
Original Filed April 29, 1964

INVENTOR
Loris Giardino

INVENTOR
Loris Giardino

United States Patent Office 3,345,753
Patented Oct. 10, 1967

3,345,753
MEASURING INSTRUMENT FOR MEASURING DISCONTINUOUS SURFACES AND TRANSDUCER THEREFOR
Loris Giardino, Via G. Rossi 4, Bologna, Italy
Continuation of application Ser. No. 363,391, Apr. 29, 1964. This application Nov. 8, 1966, Ser. No. 592,950
11 Claims. (Cl. 33—172)

ABSTRACT OF THE DISCLOSURE

A measuring instrument for taking continuous measurements upon moving surfaces, especially rapidly moving surfaces which are either discontinuous, irregular, or unsymmetrical relative to the axis of movement thereof, such as spline shafts, gear teeth, etc., which comprise indented or recessed portions intermittently of elevated portions whereby the instrument feeler means are subject to a bouncing tendency as the workpiece travels past them, said instrument including a means for absorbing this bouncing tendency without, however, exerting any positive displacement forces against the feeler means.

---

Figure 1:
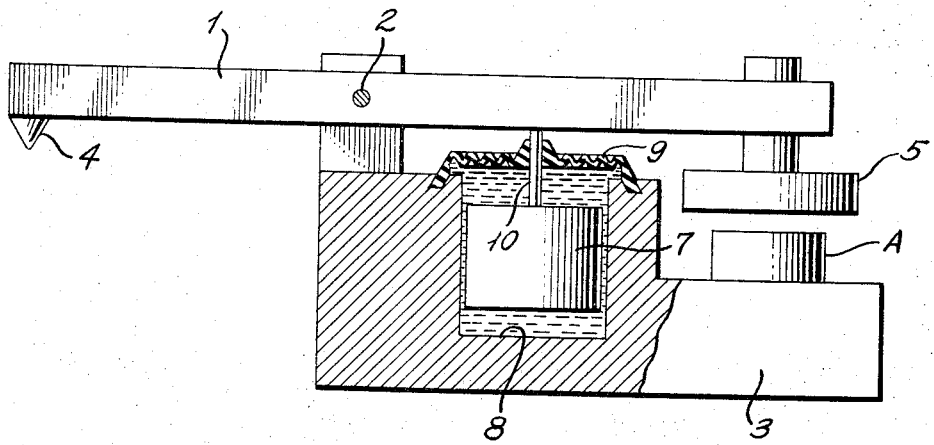

This application is a continuation of application Ser. No. 363,391, filed Apr. 29, 1964, now abandoned.

The present invention relates to a direct feeling measuring instrument which is intended to continuously measure a workpiece which is being machined, said workpiece having irregular or discontinuous surfaces, for example, a spline shaft, and said workpiece continuously moving relative to the measuring instrument while being measured.

In the manufacture of mechanical pieces it is desired to obtain a continuous measurement of the piece as it is being machined or otherwise progressively reduced in size towards a finished dimension. Measuring instruments are already well known which perform this function. They usually comprise a feeler or feelers which continuously contact the surface to be measured and thereby register the dimensions of said surface. Problems arise, however, when the surface to be measured is irregular, that is, has relatively pronounced recesses or depressions, for example, a spline shaft being machined on a lathe. In this case, the measuring instrument feeler will have a tendency to fall into the axial grooves or splineways of the spline as it rotates past the feeler. Subsequently, as the adjacent elevated or protruding key of the spline comes into contact with the feeler, a bumping reaction occurs as the feeler abruptly meets the corner of the key. This bumping could cause damage to the feeler since it could become caught by the edge of the key. More often, the feeler simply bounces over the edge of the key and loses contact with the key surface which is to be measured. This results in the fact that the micrometer cannot accurately measure the diameter of the spline shaft since the feeler is continuously bouncing over the surface thereof.

In known measuring instruments this bouncing tendency has been sought to be overcome by synchronously locking the feeler whenever the recessed portion of the workpiece passed under the feeler, thereby preventing the feeler from falling into said recessed portion. This expedient, however, incurs limitations, such as:

(a) the locking means do not function effectively with very high speeds of the workpiece;
(b) synchronization of the locking member to the positions of the recesses is difficult to achieve;
(c) the workpiece must comprise an even number of recesses since an odd number would throw the locking device out of synchronism;
(d) the recesses and the male keys must be of equal width;
(e) the location of the recesses must be well defined and exactly located so as to synchronize the locking device thereto.

The present invention obviates the above limitations and provides a direct-feeling micrometer capable of accurately and continuously measuring an irregular surface regardless of its working speed and the distribution and extent of the recesses therein. This is accomplished by connecting the measuring instrument feeler arm to a yielding dampening device which exerts a dampening force against any tendency of the feeler arm to bounce in any direction. This restraining force is non-existent when the feeler arm is not moving in any particular direction, and this force comes into being only when the feeler arm tends to bounce or deviate from a steady position. The magnitude of this restraining force is directly proportional to and oppositely directed to the inertia of the feeler arm when it tends to so bounce.

Another aspect of this invention relates to the means for registering the measurement taken by the measuring instrument feeler on an indicator.

Since the workpiece comprises an irregular surface, the feeler will detect and transmit a continuously fluctuating measurement. If this fluctuating measurement were registered on a reading device such as a dial gauge the dial would continuously move back and forth and render it impossible for the machine operator to obtain a definite reading therefrom. This invention, therefore, provides a means whereby the reading device will register continuously only the useful measurement detected by the micrometer feeler, that is for example, the outer diameter of the male keys on a spline shaft, and will not register the non-useful measurement of the splineways.

Figure 2:
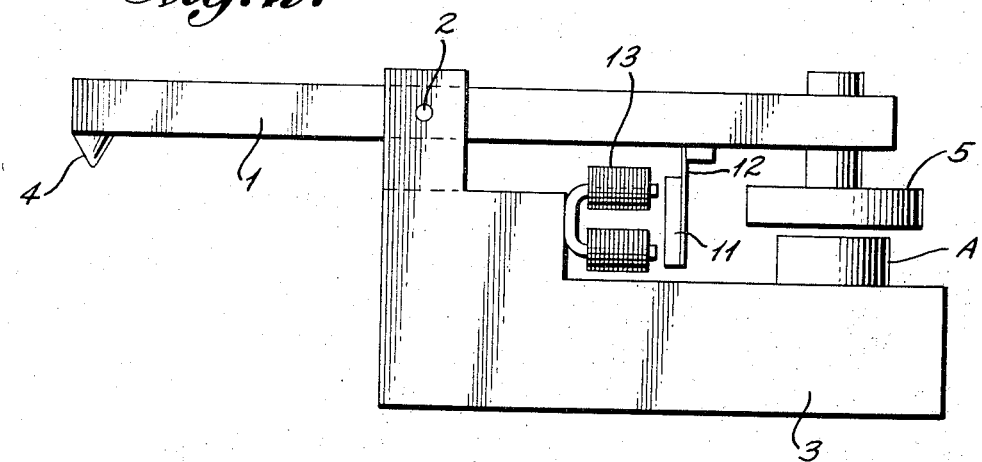
Figure 3:
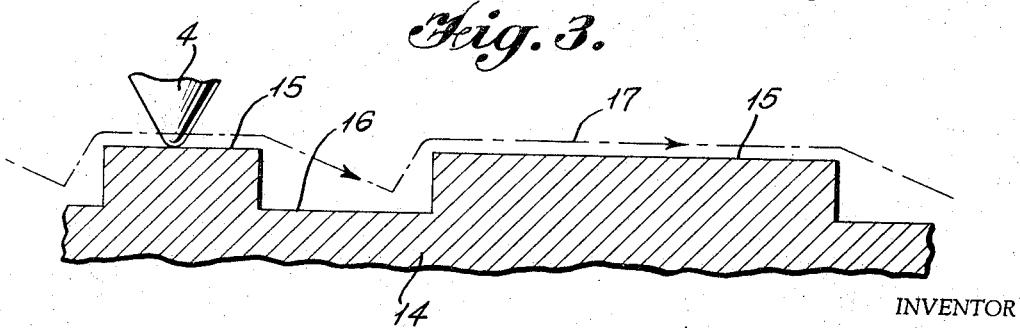
Figure 4:
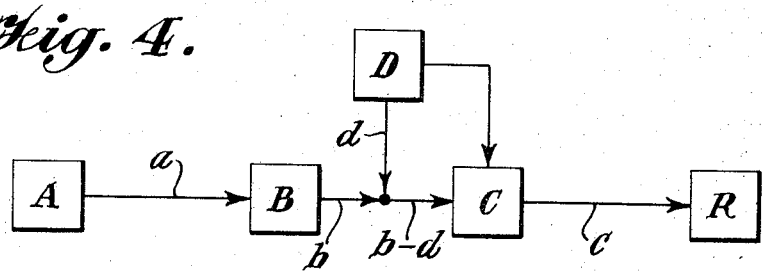
Figure 5:
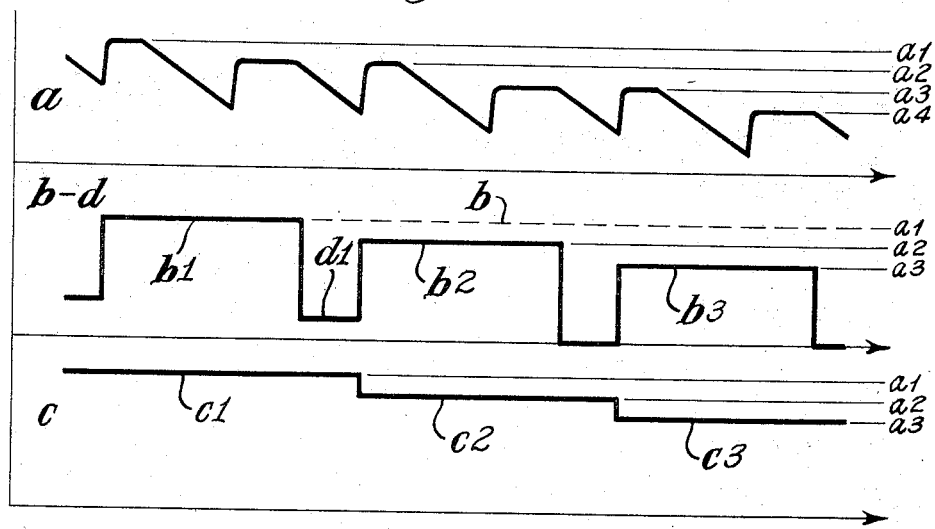
Figure 6:
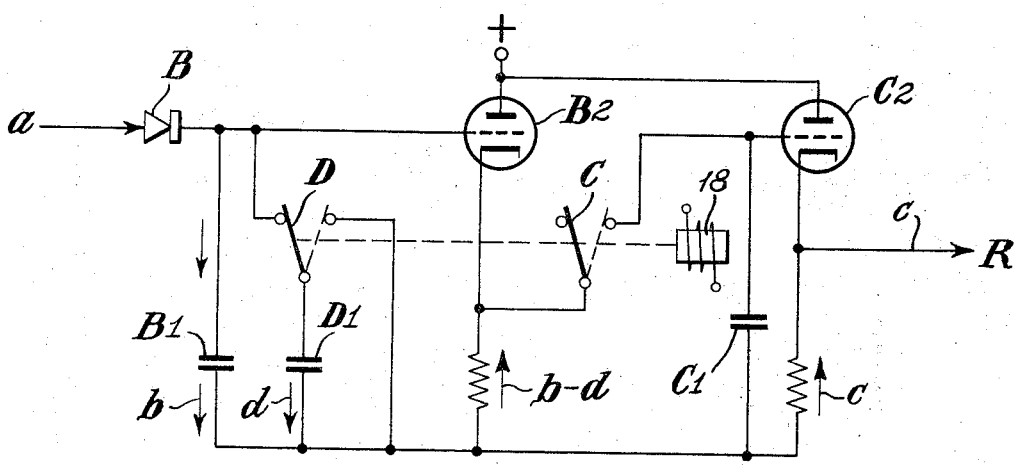

The objects of the present invention, therefore, are:

(a) to provide a direct-feeling measuring instrument which can continuously and accurately measure irregular or discontinuous surfaces;
(b) to provide a direct-feeling measuring instrument which can continuously and accurately measure irregular surfaces regardless of the number, extent and distribution of the irregularities in said surfaces and regardless of the sliding speed of the surfaces relative to the measuring instrument feeler;
(c) to provide a direct-feeling measuring instrument as described in (a) and (b) which is reliable, simple in design, and economical to produce;
(d) to provide a reading means, for a measuring instrument such as that described in (a–c), which will register a steady, continuous reading only of the useful measurement taken by said micrometer;
(e) other objects which are evident from the specification and claims and the attached drawings in which:

FIGURE 1 is a schematic drawing of a direct-feeling measuring instrument according to a preferred embodiment of the concept of this invention;
FIGURE 2 is a schematic drawing of a measuring instrument according to another embodiment of this invention;
FIGURE 3 is a schematic drawing showing the path of the measuring instrument feeler of FIGURE 1 or 2 over an irregular work piece;
FIGURE 4 is a schematic drawing of a device for transmitting the measuring instrument measurement to a reading gauge;
FIGURE 5 is a diagrammatic showing of the signals existing at various points in the device of FIGURE 4; and FIGURE 6 diagrammatically shows an electronic realization of the device of FIGURE 4.

With reference to FIGURE 1, 3 is a measuring instrument base which is to be attached to a lathe or other working machine. A feeler arm 1 is pivoted to base 3 at pivot 2 and has feeler 4 at one end thereof. Feeler 4 continuously contacts the work piece, and arm 1 pivots according to rises and falls in the surface contacted by feeler 4. The opposite end of arm 1 actuates transducer elements 5 and A which translate the position of arm 1 into a measurement signal which can be read by the machine operator. As arm 1 pivots it vertically moves a plunger rod 10 and plunger 7 within hydraulic cylinder 8. Cylinder 8 is machined within the measuring instrument base 3 and comprises solid bottom and side walls and a resilient diaphragm 9 comprising the cylinder top wall. Rod 10 passes through a central opening in wall 9 and is fixedly and sealingly attached to top wall 9 in the vicinity of said opening. Plunger 7 fits within cylinder 8 with a side-wall clearance of a few hundredths of a millimeter. The respective moving parts are arranged so that plunger 7 never contacts the cylinder bottom wall, the normal clearance between the plunger and the cylinder bottom wall being on the order of a few millimeters. Diaphragm 9 seals the top of the cylinder while at the same time allowing free vertical movement of plunger 7 and rod 10.

The cylinder 8, excepting for plunger 7 and rod 10, is completely filled with a viscous fluid which must be completely free of gas bubbles in order to assure accurate functioning of the device.

It will thus be seen that any tendency of the feeler 4 to either fall into recesses or to bounce over ridges on an irregular surface will be dampened by the action of the viscous fluid acting upon plunger 7. When the feeler 4 tends to fall into a recess, the plunger 7 will tend to be moved upwardly by the arm 1. This will cause it to press against the viscous fluid in the top portion of the cylinder creating a positive pressure on top of the plunger and forcing said fluid downwardly in the side wall clearance space between the plunger and cylinder. Upward movement of the plunger would also create a negative pressure on the bottom side of the plunger. Therefore, the positive pressure above the plunger and the negative pressure below said plunger will tend to stabilize the plunger and the feeler arm 1 so that the feeler 4 will just barely be permitted to fall into the recess. When the feeler 4 tends to bounce over the edge of an adjacent ridge, the operation is reversed and the feeler will be maintained in contacting relationship with the surface of the ridge.

The above-described operation of the device is illustrated in FIGURE 3 where the path of feeler 4 over a workpiece 14 which has ridges 15 and recesses 16 is indicated by dash line 17.

Diaphragm 9 has an undulating cross-section so that movement of plunger rod 10 does not bring about any change in the volume enclosed by said diaphragm. It is to be understood, however, that the construction of the hydraulic cylinder and its related parts is susceptible of many modifications without departing from the inventive scope of this invention.

FIGURE 2 illustrates a modification of the embodiment of FIGURE 1 wherein the hydraulic dampening means 7–10 are replaced with electromagnetic dampening means 11–13. In this device, 12 is a leaf spring attached to arm 1 and having metallic shim 11 attached thereto; 13 is an electromagnet energized by an alternating current which flows continuously during operation of the micrometer. Shim 11 vibrates towards and away from the magnet 13 with a frequency twice that of the energizing alternating current. The making and breaking of mechanical contact between shim 11 and the magnet shoes produces a flexibility in the frictional engagement between said shim and shoes which yieldingly resists vertical movement of the arm 1 and thereby serves as a motion dampening device.

FIGURES 4–6 relate to the transducer device 5–A of FIGURE 1. This device translates the position of the arm 1 into a measurement signal. The signal $a$ produced by element A (FIGS. 1 and 4) is diagrammatically reproduced in FIGURE 5. It is seen that this signal closely resembles the actual outline of the path followed by feeler 4 over an irregular surface. The dimension of the surface being machined progressively decreases from $a1$ to $a2$, etc., for each complete machining cycle, for example, for each 360° of rotation of a shaft on a lathe. If signal $a$ were reproduced on a dial gauge, the machine operator would see the dial fluctuating back and forth in conformity with the up and down outline of curve $a$.

In order to eliminate this fluctuation, signal $a$ is fed into element B which is a peak measuring device. That is, element B only registers the highest or peak points of curve $a$ and sends out signal $b$ (indicated by dash lines in FIGURE 5) which is a straight, horizontal line corresponding to the highest point of curve $a$. A curve such as $b$ does not, however, indicate the progressive reduction in size of the workpiece after each machining cycle. Therefore, a pulse device D sends out periodic pulses to depress signal $b$ and to cause peak device B to send out new signals $b-2$, $b-3$, etc., which correspond to the consecutive new peak values of signal $a$ after each machining cycle. The signal from element B, modified by the pulses from element D, is indicated as $b-d$ in FIGURES 4 and 5.

It will be noted that although curve $b-d$ has only one-half the number of depressions as curve $a$, it still cannot be effectively registered on a reading gauge since the reading dial would still fluctuate too rapidly to be read by an operator. Signal $b-d$ is, therefore, fed into element C which forwards the signal $b-d$ to indicating gauge R. Element C, however, is correlated with pulse element D so that during the time when D is sending out, for example, pulse $d-1$, element C will cut off the gauge R from the depressed signal $b-d$ but will continue to send to R a signal equal to $b-1$ until the pulse $d-1$ ends; then, element C will transmit signal $b-2$ to reading gauge R. This results in a signal $c$ which is seen to be steady and gradually diminishing in amplitude after each machining cycle from $c-1$ to $c-2$ to $c-3$, etc.

It should be particularly noted at this point that it is immaterial whether the periodic pulses $d$ occur when the feeler is over a ridge or over a recess since the pulses $d$ only affect the peak signal $b$ and they do not affect the measurement signal $a$. The only condition to be met is that between any two successive pulses $d$ the feeler 4 must contact a ridge in order to establish a new peak signal. For example, with reference to FIGURE 5, after pulse $d-1$, a ridge must be encountered by the feeler in order to establish new peak signal $b2$. The pulses $d$ need not be synchronized with the recesses in the work piece so long as the time interval between pulses is greater than the time interval between successive ridges contacting the feeler 4.

It will be noted from FIGURE 5 that curve $c$ does not strictly indicate a continuous measurement reading of the work piece but rather indicates periodically updated readings. This is quite acceptable so long as the updating frequency closely approaches the frequency of the machining cycle. For example, the periodic readings $c-1$, $c-2$, $c-3$, etc., are quite acceptable so long as they respectively correspond to consecutive 360° turns of a shaft on a lathe.

FIGURE 6 diagrammatically shows an electronic realization of the device of FIGURE 4, it being understood that the device of FIGURE 4 is not limited to this specific form of realization since other means, such as pneumatic or hydraulic circuits as well as other electronic circuits, could be adapted to carry out the functions outlined in FIGURE 4.

In FIGURE 6, an electric signal $a$ coming from the micrometer translator (A in FIGURES 1 and 4) is fed to a peak measuring device corresponding to B in FIGURE 4 and comprising rectifier B and capacitor B–1 connected to the grid of triode C–1. The switching contact D is mechanically connected to contact C, both contacts being actuated simultaneously by relay 18. Relay 18 is controlled by a separate circuit which is energized either synchronously with the position of the work piece relative to the machining tool or independently of this position, depending upon the particular requirements of the work piece.

With the contacts C and D in the dashed line position in FIGURE 6, the operation is as follows. Measurement signal $a$ is passing through rectifier B and capacitor B–1 and is emerging as signal $b$. The triode B–2 is open by virtue of the potential of its control grid which is connected to the rectifier B, relative to its cathode, and triode C–2 is open because its control grid is connected to the cathode of triode B–2 through contact C. The peak signal coming from capacitor B–1 is, therefore, translated into signal $c$ flowing through triode C–2. When relay 18 switches contacts C and D to the solid line positions shown in FIGURE 6, capacitor D–1 imposes a depression pulse on the peak signal which is coming from B–1 and is flowing through triode B–2. At the same time, contact C disconnects signal $b$–$d$ from the control grid of triode C–2 thereby eliminating any connection between the depressed signal $b$–$d$ and the signal $c$ which is going to indicator R. With contact C disconnecting signal $b$–$d$ from the control grid of triode C–2, capacitor C–1 assumes the function of maintaining the potential of the control grid of triode C–2 at the same potential as before it became disconnected from the cathode of triode B–2. This means that capacitor C–1, so long as contact C is in the solid line position, serves as a memory device since it maintains a signal $c$ even though the incoming signal $b$–$d$ has been disconnected from the indicating signal $c$.

It will be seen, therefore, that, in FIGURE 6, elements B, B–1, B–2 translate the signal $a$ into signal $b$. Elements D and D–1 apply a depressing pulse to signal $b$ which results in signal $b$–$d$. Signal $b$–$d$ is translated into signal $c$ by elements C and C–2 during those periods when the depressing pulse is not applied; when the pulse is applied, element C disconnects signal $b$–$d$ from signal $c$ and element C–1 performs the memory function of maintaining signal $c$ at its last level. Elements B, B–1, B–2 may be said to constitute block B in FIGURE 4; elements D and D–1: block D; elements C, C–1 and C–2; block C.

The triodes B–2 and C–2 do not alter the profile of the respective signals which pass through them; they do, however, prevent the signal in the later stages of the circuit from affecting the signal in the earlier stages of the circuit.

The simultaneous movement of contacts C and D assures synchronous updating of the measurement signal (from $c$–1 to $c$–2 to $c$–3, etc.) with the depression of the peak signal $b$.

It will be understood that the invention is susceptible of modifications without departing from the inventive concept thereof. The particular dampening means of FIGURES 1 and 2 can be substituted by any number of equivalent dampening means. The electronic circuit of FIGURE 6 is only one possible electronic circuit for carrying out the functions of the device outlined in FIGURE 4, in addition to the fact that the device of FIGURE 4 could also be realized through a hydraulic or a pneumatic circuit. The invention, therefore, is not intended to be limited by the embodiments herein disclosed.

What is claimed is:

1. In a measuring instrument of the direct feeling type for taking a measurement of portions of a moving surface, and which includes: a feeler means movable in opposed directions towards and away from said portions and for remaining in contact against said portions as they move past said feeler means, said means normally tending to move in a one of said directions towards said portions, and which further includes a means to prevent said feeler means from bouncing in a direction away from said surface portions, the improvement comprising the fact that the bouncing preventing means comprises: an energy dissipating means for absorbing and dissipating any bouncing forces induced in said feeler means by the movement of said surface, the improvement further comprising the fact that said energy dissipating means only absorbs and dissipates energy without exerting any return forces upon said feeler means.

2. In a measuring instrument of the direct feeling type for continuously taking measurements upon a surface of a work piece while said piece is continuously moving relative to the measuring instrument, and wherein said measuring instrument comprises a feeler means for resting against a portion of the surface which is to be measured, and wherein the extent and disposition of said portion is such that said portion to be measured only intermittently passes across said feeler means during the continuous movement of said work piece and wherein a means is provided to prevent travel of said feeler means in a transverse direction into the empty spaces on either side of said surface portion which is to be measured, the improvement comprising: said means to prevent travel of said feeler means being comprised by a motion dampening means connected to said feeler means for yieldingly permitting motion of same in either of two opposed directions relative to said work piece while simultaneously exerting no positive forces against said feeler means to displace same from any position assumed thereby.

3. In a measuring instrument of the direct feeling type comprising a feeler means movable in either of two opposed directions, said measuring instrument being for use in the taking of continuous measurements upon a moving surface which intermittently crosses the path of movement of said feeler means whereby said feeler means only intermittently can contact the surface to be measured, and wherein said feeler means is adapted to move in a one of said directions towards said moving surface to a plane beneath the plane of said surface to be measured and is yieldingly restrained from movement in the opposite direction away from said surface to a plane outwardly removed from said surface, the improvement comprising the fact that said feeler means is connected to a motion dampening means which absorbs and dissipates forces exerted upon said feeler means in either of said directions without exerting any positive forces against said feeler means to displace same in either of said direction.

4. The measuring instrument of claim 3, including measurement transducer means associated with said feeler means, said transducer means including a means for continuously translating the position of said feeler means into a corresponding measurement signal, and a peak measuring means which is responsive to said measurement signal and is adapted to send out a steady signal proportional only to the highest value of said measurement signal.

5. The measuring instrument of claim 3, wherein said dampening means comprises a hydraulic cylinder having a plunger fitted therein with a clearance between the plunger and the side walls of said cylinder, a fluid chamber between each opposite end of said plunger and the facing ends of said cylinder.

6. The micrometer of claim 3, wherein said dampening means is a hydraulic means and including a transducer associated with said feeler means, said transducer comprising a means for translating a fluctuating measurement provided by said feeler means, into a steady indicator signal which is registrable on an indicator.

7. The measuring instrument of claim 5, said feeler means comprising a feeler surface at one end of a pivoted arm, a rod extending transversely to said arm and connected at one end to said plunger and at its other end to said arm at a point displaced from said pivot axis, said rod extending through one end wall of said cylinder, said end wall comprising a resilient diaphragm, said rod being fixedly and sealingly attached to said diaphragm at the point where said rod passes through said end wall.

8. A measuring instrument of the direct feeling type comprising a movable feeler arm including a feeler surface for contacting the surface of a work piece, said arm being connected to a motion dampening means, said dampening means permitting said arm to remain in any position assumed thereby but exerting a restraining force against said arm in opposition to any force inducing motion in said arm from a first assumed position to any other position, said dampening means comprises a metallic shim connected to said arm, an electromagnet energized by an alternating current, said shim being located near said magnet and being movable towards and away from said magnet, said shim contacting said magnet when drawn towards said magnet, a resilient member urging said shim to a position out of contact with said magnet.

9. A measurement transducer for a direct-contact measuring instrument to be used to measure discontinuous surfaces, said transducer comprising a means for translating the position of a measuring instrument feeler into a measurement signal, peak measuring means adapted to receive said measurement signal and adapted to send out a steady peak signal proportional in magnitude to the peak value of said measurement signal, a memory device adapted to receive said peak signal from said peak measuring means and adapted to send out an indicator signal proportional to said peak signal, a pulse device adapted to intermittently depress said peak signal before it reaches said memory device, said memory device being correlated with said pulse device whereby said memory device discontinues the aforementioned proportional relationship between said indicator and peak signals and simultaneously continues sending out a steady indicator signal equal in magnitude to the last indicator signal during those periods in which said peak signal is being depressed by said pulse device.

10. A measurement transducer for a direct-contact measuring instrument to be used to measure discontinuous surfaces, said transducer comprising a means for translating the position of a micrometer feeler into an electrical measurement signal, conductor means for carrying said signal to a peak measuring means adapted to send out a steady electric peak signal of a magnitude proportional to the peak value of said measurement signal, conductor means for carrying said peak signal to the cathodes of first and second triodes, means for connecting and for disconnecting the control grid of said second triode to the cathode of said first triode, a capacitor connected to the control grid of said second triode and to said conductor means for carrying said peak signal to said second triode, a pulse means adapted to depress said peak signal, a means for simultaneously actuating said pulse means and said disconnecting means so that said second triode grid is disconnected from said first triode cathode when said pulse means is depressing said peak signal.

11. In an arrangement for continuously taking measurements upon moving surface portions which intermittently are contactable by a stationary measuring means, comprising: work means having a surface to be measured, said work means being movable along a first path of movement, a measurement means stationarily positioned relative to said first path of movement and comprising a feeler means movable in opposed directions along a second path transversely to said first path of movement and to points on either side of the plane of said surface to be measured, said feeler means normally tending to move in a direction towards the axis of said first path of movement of said work means, and including a means to maintain said feeler means in the plane of the surface which is to be measured, the improvement comprising the fact that said means to maintain said feeler means is a motion dampening means connected to said feeler means and yieldingly restraining same from moving in either of said opposed directions from any position assumed by said feeler means along said second path of movement.

References Cited
UNITED STATES PATENTS

| | | |
|---|---|---|
| 565,723 | 8/1896 | Chalmers. |
| 1,553,814 | 9/1925 | Hansen. |
| 1,946,924 | 2/1934 | Allen et al. |
| 2,527,173 | 10/1950 | Boat. |
| 2,619,200 | 11/1952 | Pezdic. |
| 3,000,101 | 9/1961 | Geardine et al. |

LEONARD FORMAN, *Primary Examiner.*

WILLIAM D. MARTIN, JR., *Examiner.*